Nov. 22, 1927.
C. FROESCH
1,650,203
FLEXIBLE VEHICLE BODY
Filed Sept. 5, 1924       2 Sheets-Sheet 1
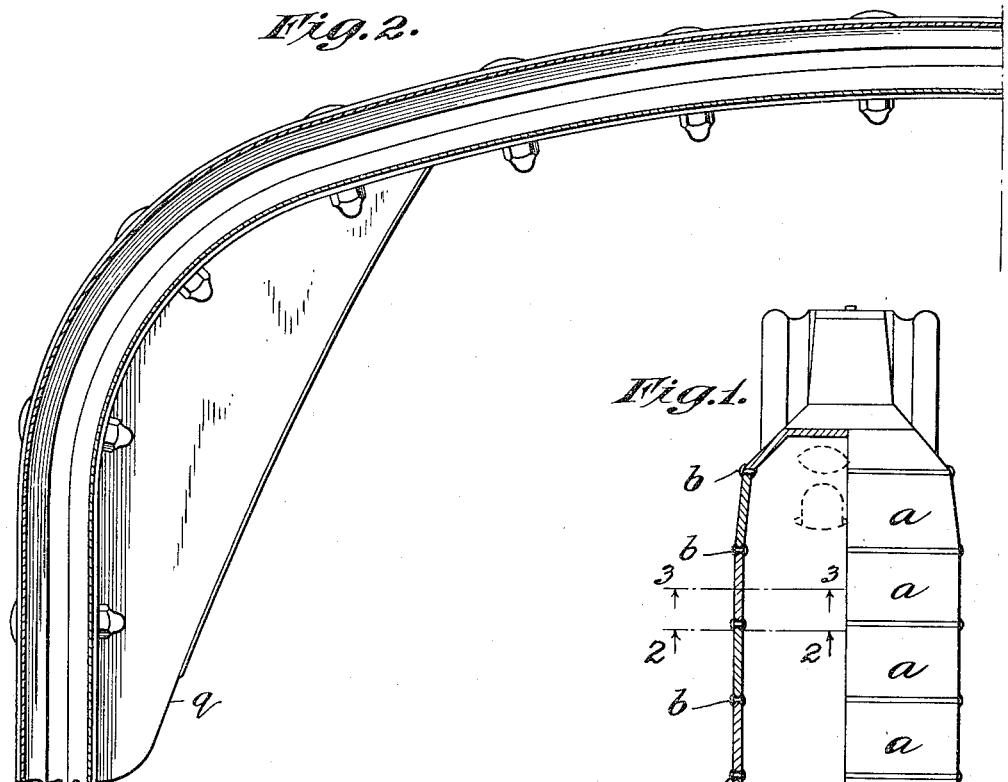
Fig. 2.
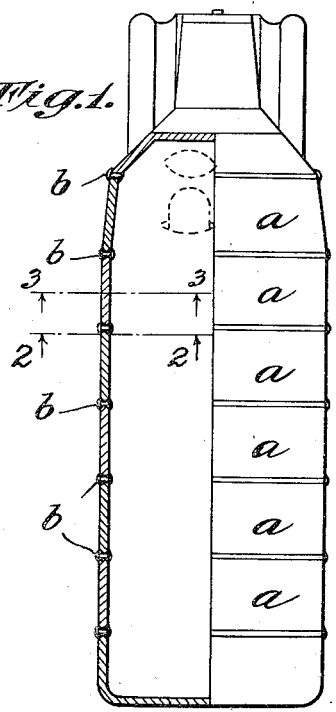
Fig. 1.
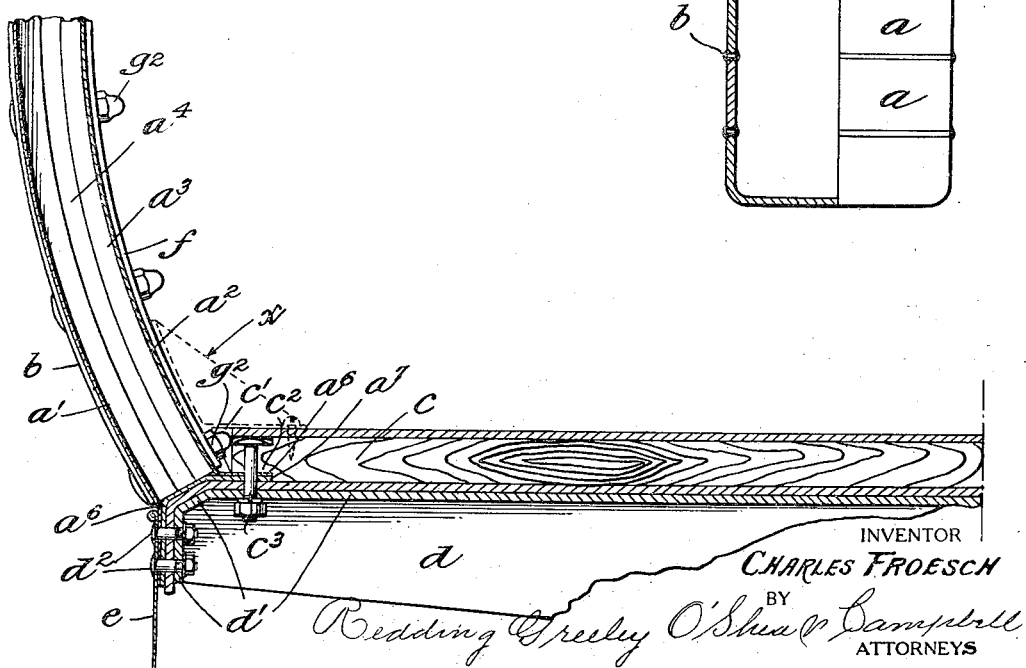
INVENTOR
CHARLES FROESCH
BY
Redding Greely O'Shea & Campbell
ATTORNEYS Nov. 22, 1927. 1,650,203
C. FROESCH
FLEXIBLE VEHICLE BODY
Filed Sept. 5, 1924  2 Sheets-Sheet 2
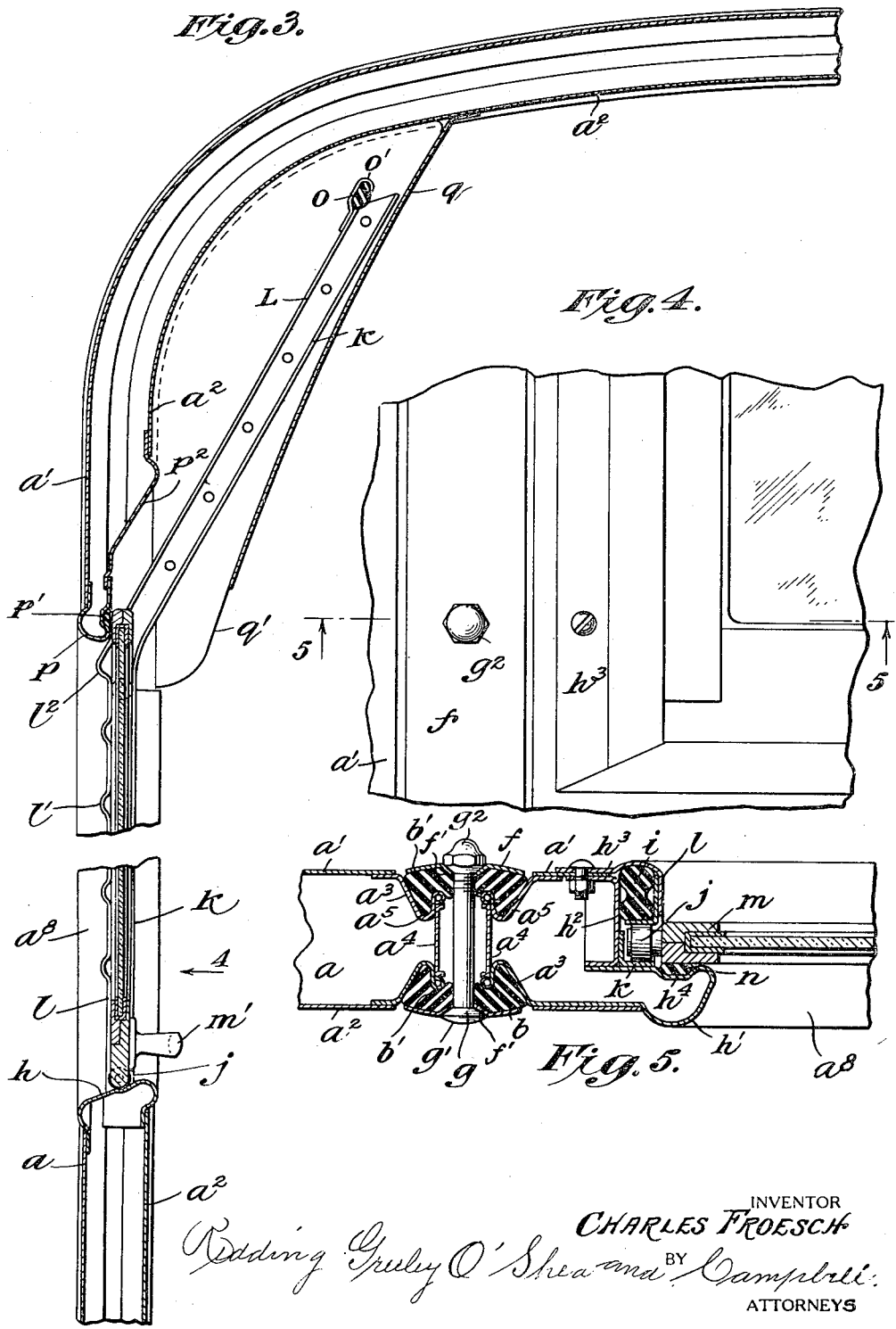

Patented Nov. 22, 1927.

1,650,203

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

FLEXIBLE VEHICLE BODY.

Application filed September 5, 1924. Serial No. 736,009.

This invention relates to bodies for vehicles and more particularly to bodies for motor vehicles of the passenger carrying type such as are commonly known as motor buses. Conditions surrounding the travel of passenger carrying vehicles at relatively high speeds over highways differ materially from those of any other type of vehicle employed on roads or rails. Inequalities in the roadbed, for instance, set up strains and stresses in the chassis frame and give rise to a tendency to weave. Motor vehicle designers have hitherto attempted to combat this tendency to weave on the part of the chassis frame by strongly re-enforcing the frame and constructing the body of heavy, stiff materials, strongly re-enforced to produce a comparatively inflexible body which would not buckle or weave or give rise to rattles and other objectionable noises. In the co-pending application of Alfred F. Masury Ser. No. 714,252 filed May 19, 1924, there is disclosed a vehicle construction involving a flexible chassis frame and a highly flexible body structure whereby weaving of the chassis frame is permitted and the body accommodates itself to the movements of the frame. The construction described in the prior application, however, does not conform to the present conception of vehicle bodies, in that the body is composed, for the most part, of flexible material. The present invention seeks to provide a body structure which shall conform to present conceptions of vehicle body design so far as material and outward appearance are concerned while at the same time permitting the desired degree of flexibility to accommodate itself to movements of the chassis frame. As in the prior application, the floor of the vehicle which supports directly the seats, is carried directly on the chassis frame to reduce as much as possible the height of the center of weight above the ground in the interest of stability and to afford the greatest degree of convenience to passengers in mounting and alighting from the vehicle. It is proposed, according to the present invention, to form the body of a plurality of sections which, when assembled, and secured directly to the chassis frame will form the sides and roof of the vehicle and enclose the floor and the seats supported thereon. To afford the requisite degree of flexibility whereby the body may accommodate itself to the weaving of the chassis frame it is proposed to secure the units to each other by yielding connections of a non-metallic character. Such connections serve a dual function since they not only permit relative movement to a degree between the units but also serve to cushion or absorb any shocks or vibrations which might be impressed upon one such unit and prevent their transmission in whole or in part to an adjacent unit. More particularly the adjacent edges of proximate units are recessed and strips of yielding non-metallic material, such as rubber, overlie the adjacent edges and enter the recesses to be retained therein by metallic clamping elements for the purpose specified.

From commercial considerations motor busses must be designed to seat different numbers of passengers dependent upon the route, conditions of service, etc. and heretofore the manufacturer has been compelled to build bus bodies individually to meet particular orders. In the co-pending application of Alfred F. Masury Ser. No. 673,419 filed Nov. 8, 1923, there is disclosed a type of body particularly adapted for motor busses which may be fabricated from a plurality of standardized sections. Another object of the present invention is to provide a vehicle body which may be fabricated with any predetermined number of standardized sections depending upon the capacity desired, the chassis, of course, lending itself to variations in size. More particularly, the invention consists in the provision of standardized unitary U-shaped sections of predetermined length adapted to be arranged transversely of the chassis, the number of such units employed being dependent upon the carrying capacity desired and each said section or unit being connected to adjacent units by the yielding non-metallic connections hereinbefore discussed.

The invention is further concerned with certain details of construction having in mind cheapness in manufacture, durability in use and facility in assembly. For instance, it is proposed to fabricate each unit of pressed metal sections, preferably although not necessarily welded together and having apertures in each unit for the body windows. The invention has for a further object the association with the windows of cushioning elements which contribute to the securing of the windows in position without rattle or noise.

These and other objects of the invention will be apparent from the following detailed description taken in connection with the accompanying drawings illustrating a preferred embodiment thereof and in which:

Figure 1 is a plan view, partly in section, showing the body of a motor bus formed of similar interchangeable units interconnected by the yielding non-metallic connecting elements according to the present invention.

Figure 2 is a transverse sectional view taken in the plane indicated by the line 2—2 in Figure 1 and looking in the direction of the arrows and showing the means for securing an individual unit to the vehicle frame.

Figure 3 is a transverse sectional view taken in the plane indicated by the line 3—3 in Figure 2, showing in detail a window frame and window according to the present invention.

Figure 4 is a fragmentary view looking from the right in Figure 3, in the direction of the arrow indicated at 4.

Figure 5 is a fragmentary sectional view taken in the plane indicated by the line 5—5 in Figure 4 and looking in the direction of the arrows and showing the yielding non-metallic connection between adjacent units of the vehicle body.

Referring to Figure 1 the bus body comprises a plurality of similar units $a$ which are adapted to be assembled upon the vehicle frame or floor in number dependent upon the length of the body. To permit a degree of articulation between the units upon weaving of the vehicle frame yielding connections indicated in general at $b$ are interposed between the body sections. In Figure 2 the floor board $c$ of the vehicle is shown as resting directly upon the chassis frame (not shown) and the out-rigger $d$ as will be readily understood whereby the height of the floor above the ground is reduced to the minimum. Such a floor follows every movement of the chassis frame as when the chassis weaves in passing over inequalities in the road.

The units $a$ are generally of inverted U-shape, the ends of the legs of the U being secured to the chassis of the vehicle upon opposite sides thereof. Preferably the sections are formed of pressed metal and comprise the outer shell $a'$ and the inner shell $a^2$ running continuously from the lower edge of the unit upon one side of the vehicle to the corresponding edge upon the opposite side of the vehicle. To the edges of the shells are secured, as by welding, reversely curved sheet metal strips $a^3$, the reverse curves of which form recesses for engagement by the yielding non-metallic material. Between the outer edges of the strips $a^3$ and forming respectively the spaced proximate edges of adjacent units are strips of metal $a^4$. Both seat members $a^3$ and edge members $a^4$ run continuously throughout the entire length of the units as described in connection with the shells $a'$ and $a^2$. Strips or ribbons $b'$ of yielding non-metallic material are disposed in overlying relation with the proximate edges of adjacent units $a$ and are so formed as to enter the recesses $a^5$ formed by the reverse curves in the members $a^3$. These strips are of such length as to run continuously from an edge of the body upon one side of the vehicle to the corresponding edge upon the other side of the vehicle and are adapted to be retained within the respective grooves by means of flexible plates $f$ upon the inner and outer sides of the vehicle. These plates likewise run from an edge of the unit upon one side of the vehicle to a corresponding edge upon the opposite side of the unit and are formed at intervals with countersunk holes $f'$ through which pass bolts $g$, the heads $g'$ of which engage the holes $f'$ in one retaining strip $f$ and the nuts $g^2$ engaging the holes $f'$ in the other retaining strip. By suitably taking up on the nuts $g^2$ the rubber cushions $b'$ may be placed under the desired degree of tension to rigidly retain the material in engagement within the recesses $a^5$ and serve as positive connections between adjacent units.

The lower edge of the shells $a'$, $a^2$ are bent outwardly as at $a^6$ and are adapted to have welded thereto a plate $a^7$ shaped to engage the flange $d'$ of the out-rigger $d$ and to be secured thereto in any convenient manner as by the bolts $d^2$. Floor $c$ is preferably recessed as at $c'$ for the reception of the nut $g^2$ of the lowermost bolt $g$ and is also recessed as at $c^2$ for engagement with the flange $a^6$, bolts $c^3$ passing through the floor $c$ and the flange $d'$ serving to fasten the inner side of the plate $a^7$. The usual apron $e$ may be secured to the outer side of the out-rigger by the bolts $d^2$ to enclose the underside of the vehicle. If deemed necessary gusset plate $x$ may be used to obtain greater rigidity at the anchor of each unit to the floor Figure 2.

Conveniently placed in the vertical sides of each unit are window openings $a^8$. These openings are formed by cutting out suitable apertures in the shells $a'$, $a^2$ and fitting therein suitable pressed metal window frames. The window frame may comprise a suitable window sill portion $h$ formed of pressed metal and preferably welded to the shells $a'$, $a^2$ and inner side frame members $h'$ welded on the one hand to the inner side of the shell $a^2$ and on the other hand to a pressed metal channel $h^2$. A pressed metal outer frame member $h^3$ is adapted to be secured outwardly of the shell $a'$ and to form with the channel $h^2$ a recess for the reception of a block $i$ of yielding non-metallic material which is preferably recessed upon opposite sides to form a bar of material having the cross section of a dumb-bell and adapted to engage through plate 1 with a roller $j$ carried on the window sash indicated in general at $m$. The roller $j$ is adapted to travel in a guide formed by a pressed metal angle $k$, one arm of which is welded to the channel $h^2$ and the other arm of which is welded to the inner frame member $h'$, while the other side of the guide is formed by an angle $l$ slidable in a transverse direction with respect to the outer frame member $h^3$ and adapted to be maintained yieldingly against the roller by means of the rubber cushion $i$. The inner window frame member $h'$ may be grooved as at $h^4$ to receive a strip of yielding non-metallic material $n$ engaging the end of the window sash $m$ and yieldingly pressing the window outwardly to maintain the roller always against the guide $l$. Guide $l$ is recessed at intervals as at $l'$ for the reception of the roller $j$ whereby the window may be retained at predetermined points partially open to the desired degree. Guides $l$ and $m$ are turned inwardly at the upper end of the window opening as at L, K, and serve to receive the sash when in fully open position, a strip of yielding non-metallic material $o$ being retained by suitable retaining member $o'$ at the upper end of the guide portion L to engage the top edge of the sash and yieldingly maintain it in open position, the lower edge of the sash resting then in the recess $l^2$ in the guide $l$. The top of the window is closed by a bent metal frame member $p$ formed with a recess $p'$ for the reception of a rubber cushion element adapted to engage the upper end of the sash to prevent rattling when in closed position. To receive the end of the sash in closed position for convenience in assembly the top frame member may be formed in two pieces, an inner top member $p^2$ being welded to the inner shell $a^2$ as will be clearly apparent from an inspection of Figure 3 and so formed as to provide a clearance for the upper end of the sash in opening and closing the window. As a re-enforcing element and to serve as an enclosure for the sash in fully open position a plate $q$ of pressed metal may be secured to the top portion of the inner shell $a^2$ at its upper end and to the vertical portion of the inner shell member at its lower end, an opening $q'$ being formed in the lowermost portion thereof for the reception of the handle $m'$ of the sash.

It will be observed that the construction of the recesses $a^5$ for the reception of the strips $b'$ of yielding nonmetallic material and the retaining strips $f$ connected by the through bolts $g$ permit the retention of the yielding nonmetallic material within the recesses under compression. By taking up on the nuts $q^2$ the material $b'$ may be retained under the desired degree of pressure. Preferably rubber is used as the yielding nonmetallic material. By so retaining the rubber under compression its strength, resiliency and wearing qualities is materially increased.

Certain sections of the body, as is clearly apparent upon inspection of Figure 1, are not identical or interchangeable. However, it will be observed that all of the various sections of the body may be interconnected by yielding non-metallic material and it is to be understood that the invention is not to be limited to the connection of interchangeable body units.

It will thus be seen that a body construction has been provided wherein each panel is free to move with relation to adjacent panels in practically any direction and that thus there has been provided a flexible body which will weave with the chassis frame and thereby ensure longer life to the body. The construction provides a light and flexible construction which does away with the conventional body frame and the use of standardized panels permits the body to be accommodated to different requirements and lengths of chassis frame.

It will be understood that the various units need not be made of a single sheet of metal but from considerations of cheapness of manufacture and ease of production, each unit may be built of a plurality of parts such as, for instance, side portions and a roof portion which may be assembled to form the unit either prior to or during the assembly of the body.

Various modifications may be made in the construction and configuration of the individual body panels or units without departing from that aspect of the invention which contemplates the interconnection of the various panels by means of yielding non-metallic material and no limitation is intended except as indicated in the appended claims.

What I claim is:

1. The combination with a vehicle chassis, of a body fabricated from a series of spaced body units, yielding non-metallic and resilient material spacing the units, and means to cause the yielding material to interconnect the units positively.

2. The combination with a vehicle chassis, of a body fabricated from a series of similar, interchangeable, standardized units and yielding non-metallic and resilient material interconnecting the units.

3. The combination with a vehicle chassis, of a body fabricated from a series of similar, interchangeable, standardized units disposed transversely of the chassis and each including a horizontal portion and two vertical side portions and yielding non-metallic connections between the units and comprising strips of yielding non-metallic material overlying the inner and outer edges respectively of adjacent units, and means to maintain said strips in engagement with the units.

4. The combination with a vehicle chassis, of a body fabricated from a series of similar, interchangeable, standardized units disposed transversely of the chassis and each including a horizontal portion and two vertical side portions formed with recesses adjacent their edges and yielding non-metallic connections between the units and comprising strips of yielding non-metallic material overlying the inner and outer edges respectively of adjacent units, and means to maintain said strips in engagement with the recesses formed in the units.

5. The combination with a vehicle chassis, of a body fabricated from a series of similar, interchangeable, standardized pressed metal units disposed transversely of the chassis and each including a horizontal portion and two vertical side portions formed with recesses on the inner and outer sides of the units adjacent their edges and yielding non-metallic connections between the units and comprising strips of yielding non-metallic material running continuously throughout the length of the unit and overlying the inner and outer edges respectively of adjacent units, means to maintain said strips in engagement with the recesses formed in the units, plates engaging the outer surface of the strips respectively and bolts connecting the respective plates.

6. The combination with a vehicle, of a body fabricated from a series of similar, interchangeable, standardized pressed metal units disposed transversely of the vehicle, each including a horizontal top portion and two vertical side portions, said vertical side portions being formed on their lowermost edges with flanges for engagement with a supporting element of the vehicle and yielding non-metallic and resilient means securing said units together.

7. The combination with a vehicle, of a body fabricated from a series of similar, interchangeable, standardized pressed metal units formed of an outer and an inner sheet metal shell member disposed transversely of the vehicle, each including a horizontal top portion and two vertical side portions, said vertical side portions being formed on their lowermost edges with flanges for engagement with a supporting element of the vehicle and yielding non-metallic and resilient means securing the shell members of the respective units together.

8. The combination with a vehicle chassis, of a body fabricated from a series of similar, interchangeable, standardized units disposed transversely of the chassis and each including a horizontal portion and two vertical side portions formed with recesses adjacent their edges and yielding non-metallic connections between the units and comprising strips of yielding non-metallic material overlying the inner and outer edges respectively of adjacent units, and means to maintain said strips under compression in engagement with the recesses formed in the units.

9. The combination with a vehicle chassis, of a body fabricated from a series of similar, interchangeable, standardized pressed metal units disposed transversely of the chassis and each including a horizontal portion and two vertical side portions formed with recesses on the inner and outer sides of the units adjacent their edges and yielding non-metallic connections between the units and comprising strips of yielding non-metallic material running continuously throughout the length of the unit and overlying the inner and outer edges respectively of adjacent units, means to maintain said strips in engagement with the recesses formed in the units, plates engaging the outer surface of the strips respectively, and bolts connecting the respective plates to retain the yielding non-metallic material under compression.

This specification signed this 3rd day of September A. D. 1924.

CHARLES FROESCH.